Sept. 6, 1927.

C. W. STEEN 1,641,704

ALTERNATING CURRENT MOTOR

Filed Oct. 16, 1922

Inventor
C. W. Steen
by
Attorney

Sept. 6, 1927.

C. W. STEEN 1,641,704

ALTERNATING CURRENT MOTOR

Filed Oct. 16, 1922

Inventor
C. W. Steen
by G. J. Delvin
Attorney

Patented Sept. 6, 1927.

1,641,704

UNITED STATES PATENT OFFICE.

CHARLES W. STEEN, OF NORWOOD, OHIO, ASSIGNOR TO ALLIS-CHALMERS MANUFACTURING COMPANY, OF MILWAUKEE, WISCONSIN, A CORPORATION OF DELAWARE.

ALTERNATING-CURRENT MOTOR.

Application filed October 16, 1922. Serial No. 594,913.

This invention relates in general to motors and has particular relation to alternating current motors of the commutator type wherein the motor is started as a repulsion motor and is operated under normal running conditions with the rotor winding fully short-circuited through the commutator.

Single-phase alternating current motors are often started as repulsion motors, the sections of the rotor winding being connected to the bars of the commutator and being short-circuited successively through one or more pairs of connected brushes bearing on the commutator. Operating in this manner, the motor is brought up toward normal speed, at which time the sections of the rotor winding are all short-circuited, preferably through a short-circuiting device cooperative with all bars of the commutator. The actuation of the short-circuiting device is preferably accomplished through a centrifugally operable element effective to establish the desired short-circuit connection when the motor speed rises to a predetermined value. After establishment of this short-circuit relation, the motor then operates substantially as an ordinary induction motor with its secondary winding short-circuited.

The present invention contemplates a design of alternating current motor of the commutator type, especially a single-phase motor, wherein special provisions are made for accommodating the rotating commutator, with its starting brushes bearing thereon, and an automatically operative device for short-circuiting the commutator bars when the speed of the motor has reached a predetermined value.

It is an object of this invention to provide an improved design and construction of alternating current motor embodying an automatically operable short-circuiting device movable into and out of operative relation to the rotor windings.

It is a further object of this invention to provide an improved design and construction of alternating current, commutator-type motor embodying a special design and arrangement of automatically operable short-circuiting device for the commutator bars and the mounting and enclosing of this device and the brushes which co-operate with the commutator for starting purposes.

These and other objects and advantages are secured by the present invention, various novel features of which will be apparent from the description and the accompanying drawings, disclosing an embodiment of the invention, and will be more particularly pointed out in the claims.

Figure 1:
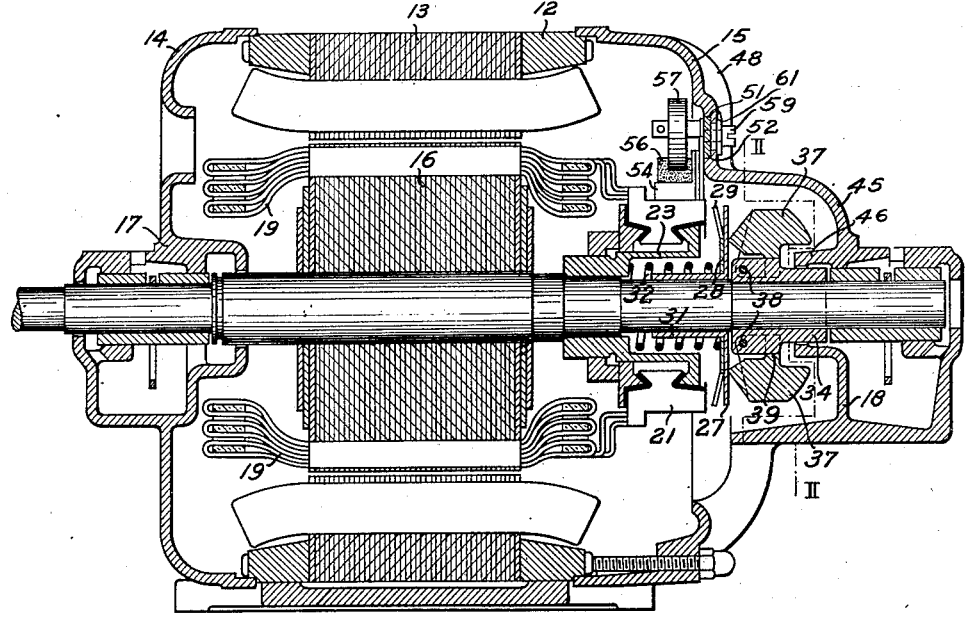
Fig. 1 is a vertical sectional view of an alternating current, commutator-type motor, embodying features of the present invention.
Figure 2:
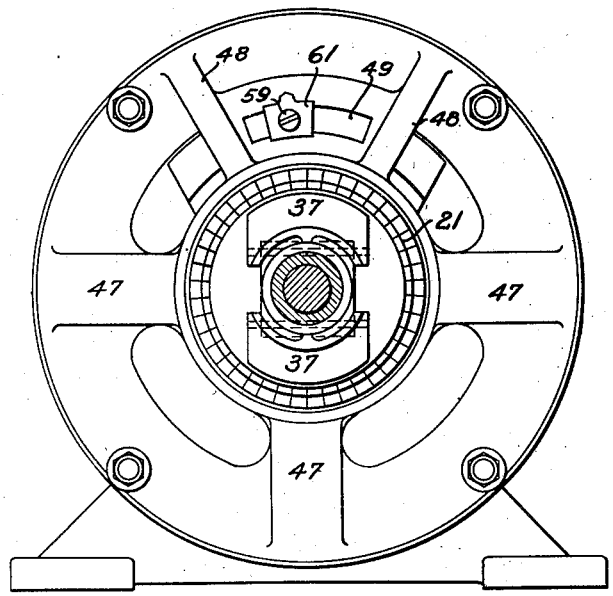
Fig. 2 is an external end elevation, with parts broken away, showing features of construction of the motor shown in Fig. 1.
Figure 3:
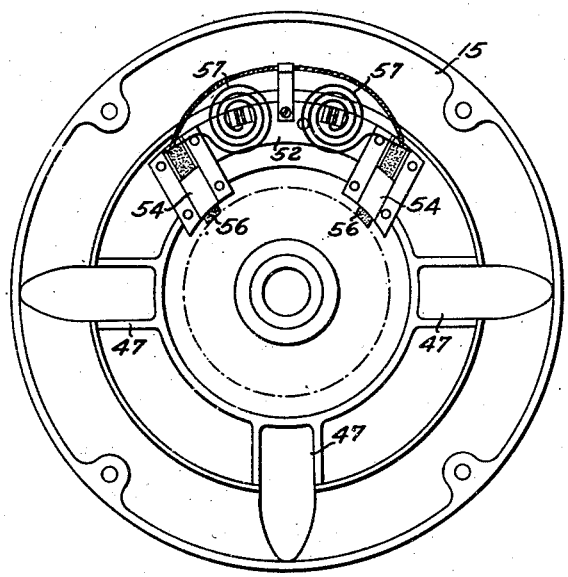
Fig. 3 is an interior end elevation of an end housing of the motor of Fig. 1, with associated parts.

In the accompanying drawings, the motor shown as embodying features of the present invention comprises a stator 12 having windings disposed in slots at the inner periphery of a core 13 of assembled laminæ. End housings 14 and 15 are secured in place, as by means of bolts extending through peripheral portions of the housings and into the stator core or the end plates thereof. The rotor 16 of the motor has its shaft rotatably mounted in bearings carried by bearing housings 17, 18 integral with the end housings. The rotor windings 19, here shown as of a special type wherein the end turns are arranged in three layers, are suitably connected to the bars of a commutator 21 which is mounted upon an overhanging portion of a support 23 held in fixed relation on the shaft.

A short-circuiting device is provided for interconnecting the several bars of the commutator. This short-circuiting device comprises a relatively rigid plate 27, upon the inner side of which is secured an annular plate 28 of conductive material which is attached adjacent its inner periphery to the plate 27, and is formed with spring fingers 29 at its outer periphery for intimate and yielding engagement with the ends of the commutator bars. The plate 27 and the short-circuiting element 28 are mounted upon the outer end of a sleeve 31 slidable upon the rotor shaft, the sleeve and parts carried thereby being normally biased to a position away from the commutator, as by means of a spring 32 surrounding the sleeve and disposed in a recess beneath the commutator support, this spring bearing against the inner end wall of the recess and the plate 27 or element 28.

A collar 34 is secured to the shaft, preferably in such position that its inner end may be engaged by the sleeve 31. A plurality of weighted levers 37 symmetrically disposed about the shaft are pivoted to projecting portions of the collar 34 adjacent its inner end, the pivotal mounting being preferably through overhanging portions which extend along the sides of the collar, as indicated at 38. These weighted elements are movable radially outward and toward the commutator in response to the effect of centrifugal force thereon, when the speed of the motor reaches a predetermined value. A shoulder or lug 39 may be formed at the radially inner side of the weighted element in such position as to engage a portion of the collar 34, or the shaft directly if a portion of the collar is not in position for such engagement and thus determine the inoperative position of the weighted element. Each of these weighted elements 37 are formed at the side adjacent the commutator with a plurality of angularly inclined surfaces which intersect to insure that the engagement between the weights and the plate 27 is substantially that of line contact.

Figure 4:
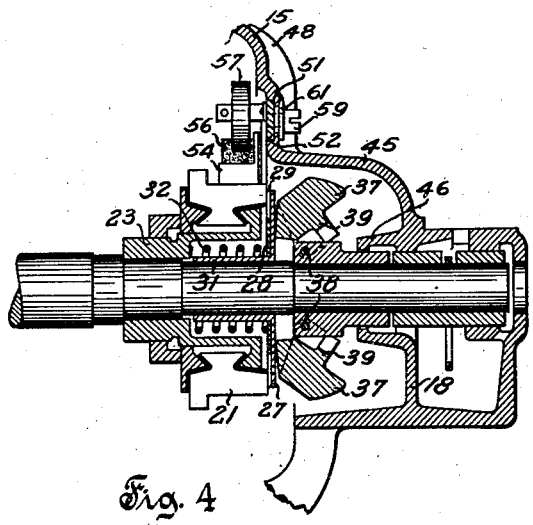
Fig. 4 is a broken vertical section, similar to Fig. 1, but showing parts in operative position.

As indicated, the weighted levers and their mounting are preferably such that the centers of gravity of the weights, in the inoperative position of the parts, is quite near the axis of the rotor shaft and at a considerable distance from the pivotal axes of the levers, so that the effect of centrifugal force on the levers is sufficient to move the short-circuiting device to operative position, as shown in Fig. 4, wherein the spring fingers 29 are held in firm and intimate engagement with the ends of the commutator bars. When the motor is operating at normal speed and the short-circuiting disk 28 has been moved into and is held in operative engagement with the ends of the commutator bars, through the action of the centrifugally operating weights 37, there may still be substantially line contact between these actuating weights and the plate 27, although the adjacent faces of the weights may approach toward coincidence with the outer side of the plate, this engagement of the weights and the plate 27 being at points on said plate appreciably removed from the outer extremity of the plate and quite near the shaft, so as to reduce as much as possible the frictionable resistance of the plate 27 or its sleeve on the shaft due to tilting components exerted by either of the weights on the plate.

The end head 15 is provided with a bell-shaped extension 45 substantially concentric with the shaft axis and of such size as to form a fairly close housing for the centrifugal weights 37 and the short-circuiting device 26. An inner cylindrical extension 46 of this bell-shaped element fits over the outer end of the collar 34 and may form an oil and dust proof closure therewith. This bell-shaped extension 45 is supported from the body portion of the end head 15 by means of three spaced ribs or arms 47 substantially 90° apart, two of said ribs being substantially alined along a horizontal diameter, and the third rib extending substantially vertical at the lower side of the housing. The construction is such as to provide relatively large apertures between adjacent ribs, thus permitting effective cooling. At the upper side of the housing, relatively smaller, spaced ribs or arms 48 are formed and serve as a partial support for the bell-shaped extension, the material of the radially extending wall of the end housing being apertured, as indicated at 49, between these ribs 48.

The inner side of the wall of the end housing adjacent the aperture 49 may be machined to provide a seat, as indicated at 51, upon which the holder or carrier 52 is slidably mounted. A plurality of brush holders 54 are mounted on the carrier 52 and serve to support brushes 56 in operative engagement with the bars of the commutator 21, follower springs 57 being mounted upon the carrier and bearing upon the outer ends of the brushes to maintain them in engagement with the commutator with the desired pressure. A flexible connection is provided between the brushes or conductive parts of their holders, this connection being supported at an intermediate point by the carrier 52. The brushes have the required degree of angular separation to produce efficient operation of the motor, and by reason of the fact that the carrier or holder 52 is shiftable circumferentially about the shaft axis, these brushes can be readily shifted to positions corresponding to efficient forward or reverse operation of the motor.

The means for shifting and holding the carrier and its brushes in the proper angular position includes a holding screw 59 threaded into the carrier and having its head projecting outwardly through the recess 49 in the housing wall and suitably machined to provide for adjustment. A clamping washer 61 is disposed upon the screw beneath the head thereof and has portions extending over the side walls of the aperture 49, so that when the holding screw is drawn up tight, the co-operation between the head of the screw and the clamping washer which bears upon the outer wall of the housing, serves to draw the carrier 52 on to its seat and to hold the same firmly in position.

When the motor is at rest, the short-circuiting device with its centrifugally actuated operating device are in the positions indicated in Fig. 1, with the brushes bearing on the commutator. When current is supplied to the stator winding of the motor, the latter starts as a repulsion motor, through the effect of the short-circuited brushes. When the motor speed reaches a predetermined value, the effect of centrifugal force upon the weighted levers 37 is such as to force them radially outward and toward the commutator, the operative engagement between these levers and the plate 27 of the short-circuiting device being such as to cause firm engagement between the spring fingers 29 of the short-circuiting disk 28 and the commutator bars, this arrangement serving to effectively short-circuit the rotor windings, thus causing the motor to operate substantially as an ordinary induction motor with a short-circuited secondary winding. This is the normal operating condition of the motor, and the parts are retained in operative condition until the current supplied to the motor is interrupted or the voltage drops to such a relatively low value as to render operation of the motor undesirable.

It will be apparent that, in accordance with the disclosure herein, there is provided an improved design and construction of an alternating current motor of the commutator type, especially advantageous for single-phase operation, wherein the desired operating effects are secured in an extremely simple manner, and the enclosing portions of the motor casing are of such design and construction as to readily enclose or house the various elements of the motor.

It should be understood that the invention claimed is not limited to the exact details of construction shown and described herein, for obvious modifications will be apparent to one skilled in the art.

It is claimed and desired to secure by Letters Patent:

1. In combination in an alternating current motor, a stator, a rotor having a commutator, an end housing on said stator having a body portion disposed substantially at right angles to the axis of the rotor shaft, and a reduced bell-shaped extension adjacent said shaft, a brush-carrying support carried by and adjustable with respect to the body portion of said end housing, a short-circuiting device carried by said shaft and movable thereon, means for urging said short-circuiting device away from said commutator, and a centrifugally operable weight located within said extension on the housing and automatically operable to shift said short-circuiting device into contact with said commutator bars.

2. In combination in an alternating current motor, a stator, a rotor having a commutator, a short-circuiting device comprising a sleeve slidable on the motor shaft radially within said commutator, a relatively rigid plate mounted on said shaft, a short-circuiting element secured to said plate and provided with spring fingers at its outer periphery co-operatively engageable with said commutator bars, a spring for urging said plate away from said commutator bars, a collar fixed on said shaft, and a plurality of weighted levers having portions thereof extending along the sides of said collar and pivotally mounted thereon, the inner side of each lever being formed to engage said plate with substantially line contact at a point radially within the outer extremity of the contact surface of said short-circuiting element and having a portion at its weighted end co-operative with said collar to determine the inoperative position of the lever, said levers being operable to shift said short-circuiting device into position wherein said spring fingers firmly engage said commutator bars.

3. In combination in an alternating current motor, a stator, a rotor having a commutator, an end housing on said stator surrounding said commutator and having a reduced, substantially concentrically disposed, bell-shaped extension integral with the body portion of the housing, a short-circuiting device carried by and movable relative to the motor shaft, a centrifugally operable device for actuating said short-circuiting device, said centrifugally operable device being located within said bell-shaped extension, a carrier slidably mounted on the end wall of said end housing radially outside of said cylindrical extension, angularly displaced brushes operatively mounted upon said carrier and co-operative with said commutator, and means for clamping said carrier in adjusted position.

4. In combination in an alternating current motor, a stator, a rotor having a commutator, a detachable end housing on said stator surrounding said commutator and having a wall portion disposed substantially at right angles to the axis of the rotor shaft, and a reduced, substantially concentrically disposed, bell-shaped extension from said wall portion of said housing, a short-circuiting device carried by and movable relative to the motor shaft, a centrifugally operable device for actuating said short-circuiting device, said centrifugally operable device comprising a plurality of pivotally mounted and weighted levers, said levers being located within said bell-shaped extension, the wall portion of said end housing radially outside of said cylindrical extension having a pair of spaced ribs and an aperture through said wall between said ribs, the said wall being machined adjacent said aperture to provide a seat, a carrier slidable upon said seat, a pair of angularly spaced brush holders and brush follower springs mounted upon said carrier, brushes within said brush holders operatively urged by said springs into engagement with said commutator, and means for clamping said carrier in adjusted position.

5. In combination in an alternating current motor, a stator, a rotor having a commutator, a short-circuiting device mounted on the shaft of said rotor and axially movable thereon, a spring for urging said short-circuiting device away from the bars of said commutator, and oppositely disposed weighted levers pivotally mounted upon the shaft and having portions extending along the sides of the shaft, the pivotal mounting of said levers being through said extending portions, a stop portion on the weighted end of each lever, means co-operative with said stop portion to determine the inoperative position of said lever, the side of said levers adjacent said short-circuiting device being formed to engage said short-circuiting device with substantially line contact, and said short-circuiting device being movable into intimate contact with said commutator bars in response to centrifugal force exerted by said weights.

6. In combination in an alternating current motor, a stator, a rotor having a commutator, a short-circuiting device axially movable on the shaft of said rotor, a spring for urging said short-circuiting device away from the bars of said commutator, and oppositely disposed weights pivotally mounted upon the shaft and formed to engage said short-circuiting device, heel portions of said weights being adapted to engage stops associated with said shaft to determine the inoperative position of said weights, said weights being operable in response to centrifugal force to force said short-circuiting device into intimate contact with said commutator bars.

7. In combination in an alternating current motor, a stator, a rotor having a commutator, an end housing on said stator surrounding said commutator and having a reduced, substantially concentrically disposed, bell-shaped extension integral with the body portion of the housing, a short-circuiting device carried by and movable relative to the motor shaft, a centrifugally operable device for actuating said short-circuiting device, said centrifugally operable device being located within said bell-shaped extension, a carrier mounted on the end wall of said end housing radially outside of said cylindrical extension, and angularly displaced brushes operatively mounted upon said carrier and cooperative with said commutator.

In testimony whereof, the signature of the inventor is affixed hereto.

CHARLES W. STEEN.